(12) United States Patent
Choi et al.

(10) Patent No.: US 10,933,942 B2
(45) Date of Patent: Mar. 2, 2021

(54) MOBILITY DEVICE HAVING TURNING ASSISTING DEVICE

(71) Applicants: HYUNDAI MOTOR COMPANY, Seoul (KR); KIA MOTORS CORPORATION, Seoul (KR)

(72) Inventors: Jungnam Choi, Seongnam-si (KR); Sung Dae Lim, Gunpo-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 227 days.

(21) Appl. No.: 16/207,756

(22) Filed: Dec. 3, 2018

(65) Prior Publication Data
US 2019/0389532 A1    Dec. 26, 2019

(30) Foreign Application Priority Data
Jun. 25, 2018    (KR) .................. 10-2018-0072540

(51) Int. Cl.
| B62K 27/00 | (2006.01) |
| B62K 27/02 | (2006.01) |
| B62K 27/12 | (2006.01) |
| B62K 27/14 | (2006.01) |
| B62K 27/16 | (2006.01) |
| B62K 13/06 | (2006.01) |

(52) U.S. Cl.
CPC .............. B62K 27/12 (2013.01); B62K 13/06 (2013.01); B62K 27/02 (2013.01)

(58) Field of Classification Search
CPC ........ B62K 27/12; B62K 27/14; B62K 27/00; B62K 27/003; B62K 27/16; B62K 13/04; B62K 13/06; B62K 27/02; B62K 27/04

USPC .......................................... 280/203, 204, 202
See application file for complete search history.

(56) References Cited

U.S. PATENT DOCUMENTS

| 1,068,835 A | * | 7/1913 | Bamford ................ B62K 27/00 280/203 |
| 1,077,743 A | * | 11/1913 | Overton ................. B62K 27/00 280/203 |
| 1,148,759 A | * | 8/1915 | Corser ..................... B62H 1/02 280/301 |
| 1,270,186 A | * | 6/1918 | Merz ....................... B62K 27/00 280/203 |
| 1,300,681 A | * | 4/1919 | Wissnnan ............... B62K 27/00 280/203 |
| 1,473,956 A | * | 11/1923 | Eyre ....................... B62K 27/02 280/288.4 |

(Continued)

FOREIGN PATENT DOCUMENTS

| JP | 2012-030700 A | 2/2012 |
| KR | 10-0914409 B1 | 8/2009 |
| KR | 10-1608186 B1 | 3/2016 |

*Primary Examiner* — Anne Marie M Boehler
(74) *Attorney, Agent, or Firm* — Brinks Gilson & Lione

(57) ABSTRACT

A mobility device includes a sidecar and a tilting vehicle including a two-wheeled bicycle, and may further include: an articulated link member including multiple link arms configured to link a vehicle body of the tilting vehicle and a body of the sidecar. In particular, linkage movements of the respective multiple link arms provide upward and downward movements, and leftward and rightward tiltings of the sidecar when a center of gravity of the vehicle body moves leftward and rightward.

11 Claims, 15 Drawing Sheets

(56) References Cited

U.S. PATENT DOCUMENTS

| | | | | |
|---|---|---|---|---|
| 1,848,451 | A | * | 3/1932 | Wishart .................. B62K 27/00 280/203 |
| 1,933,102 | A | * | 10/1933 | Du Pont ................ B62D 61/08 180/210 |
| 4,254,965 | A | * | 3/1981 | Kobel .................... B62K 27/02 280/203 |
| 4,350,359 | A | * | 9/1982 | Van Gompel .......... B62K 27/00 280/203 |
| 4,385,770 | A | * | 5/1983 | Mitchell ................. B62K 5/10 280/203 |
| 5,238,258 | A | * | 8/1993 | Michaud ................ B62K 27/00 180/210 |
| 2010/0090421 | A1 | * | 4/2010 | Yun ........................ B62K 27/00 280/5.52 |

* cited by examiner

Attorney Docket No. 15438-786

Attorney Docket No. 15438-786

Attorney Docket No. 15438-786

MOBILITY DEVICE HAVING TURNING ASSISTING DEVICE

CROSS-REFERENCE TO RELATED APPLICATION

This application claims priority to and the benefit of Korean Patent Application No. 10-2018-0072540, filed on Jun. 25, 2018, the entire contents of which are incorporated herein by reference.

FIELD

The present disclosure relates to a mobility device as a personal moving means.

BACKGROUND

The statements in this section merely provide background information related to the present disclosure and may not constitute prior art.

In general, a mobility device refers to a personal moving means made by combining an electric charging technology and a power technology, and the mobility device is also called a smart mobility device or a micro-mobility device. Representative examples of the mobility device include an electric wheel, an electric kickboard, an electric bicycle, and the like that may be seen commonly.

The most advantageous feature of the mobility device is that the mobility device is an environmentally-friendly moving means which emits no contaminants because an electric motor is used to provide power. An example of the mobility device is an electric bicycle as a two-wheeled vehicle that typically has front and rear wheels provided at front and rear side thereof, and a steering handle connected to the front wheel.

A typical two-wheeled vehicle performs a tilting operation of tilting a vehicle body in a direction of centripetal force in order to maintain a balance at the time of performing cornering. That is, the two-wheeled vehicle may be considered as a tilting vehicle which has a center of gravity that tends to tilt toward a center of a turning radius at the time of performing cornering and turning and has a structure in which a means for supporting the tilting of the vehicle body in a left and right direction is omitted.

The tilting vehicle, as the two-wheeled vehicle, may travel on a narrow road and occupy a small parking space, and has the vehicle body that is light in weight, and as a result, there is an advantage in that the tilting vehicle contributes to energy saving. However, the tilting vehicle has a drawback in that the tilting vehicle has a structural feature of a small overall width, such that a transport ability thereof deteriorates to that extent.

Therefore, in the related art, a sidecar, as a module, is mounted on the vehicle body to transport a person or freight by using the two-wheeled vehicle. In the related art, as an example, the sidecar is fixed to the vehicle body by a mechanical connecting means. Because this configuration rarely considers the cornering operation of the two-wheeled vehicle, the wheel of the sidecar is repeatedly pushed or drawn laterally in a direction in which the vehicle body tilts while the two-wheeled vehicle travels, and as a result, traveling stability deteriorates.

To solve the deterioration in traveling stability, recently, a technology is applied in which a vehicle body of a two-wheeled vehicle and a sidecar are connected to each other by using a link device, such that the sidecar tilts together with the two-wheeled vehicle when the two-wheeled vehicle performs cornering and turning. The aforementioned technology, which adopts the link device, has been disclosed in Korean Patent No. 1608186, Japanese Patent Application Laid-Open No. 2012-030700, and the like.

However, we have discovered that, in the related art, because the vehicle body and the sidecar are connected to each other by the link device having a parallelogrammatic shape when viewing the two-wheeled vehicle and the sidecar from the front side, a larger operational space of the link device, which is required in accordance with a gradient of the vehicle body, is desired.

We have also discovered that, since the link device in the related art, which has a parallelogrammatic shape when viewing the two-wheeled vehicle and the sidecar from the front side, is adopted, there may occur problems in that the entire link device warps due to continuous fatigue impact accumulating on a link bar and a link shaft of the link device, and straightness of the two-wheeled vehicle deteriorates due to the warping.

The above information disclosed in this Background section is only for enhancement of understanding of the background of the present disclosure and therefore it may contain information that does not form the prior art that is already known to a person of ordinary skill in the art.

SUMMARY

The present disclosure has been made in an effort to provide a mobility device having a link type turning assisting device in order to ensure steering performance and turning stability of a sidecar.

An exemplary form of the present disclosure provides a mobility device which is made by mounting a sidecar on at least one side of a tilting vehicle including a two-wheeled bicycle, the mobility device including: an articulated link member including multiple link arms configured to link a vehicle body of the tilting vehicle and a body of the sidecar. In particular, linkage movements of the respective multiple link arms are configured to provide upward and downward movements, and leftward and rightward tiltings of the sidecar when a center of gravity of the vehicle body moves leftward and rightward.

In one form, the multiple link arms may include first and second link arms, which respectively link the vehicle body and the sidecar body.

In addition, the articulated link member may include first to fourth joints, at which the first and second link arms are respectively linked to the vehicle body and the sidecar body.

In another form, the articulated link member may have a parallelogrammatic shape because of the first and second link arms when viewed from a lateral side of the vehicle body.

In addition, the sidecar may include a single wheel installed at one side of the sidecar body.

In another form, the sidecar may be mounted at one side of the vehicle body.

In addition, the mobility device may include another side car, and the two sidecars may be mounted at sides of the vehicle body, respectively.

In another exemplary form of the present disclosure, a mobility device including a sidecar and a tilting vehicle including a two-wheeled bicycle may include: first and second link arms which are respectively linked to a vehicle body of the tilting vehicle at first and second joints, and respectively linked to a body of the sidecar at third and fourth joints. In particular, the first and second link arms are disposed in parallel with each other in a front and rear direction of the vehicle body.

In other form, the first and second link arms may be linked to a seat tube of the vehicle body through a first joint member and linked to a lower center of a side of the sidecar body through a second joint member.

In other exemplary form of the present disclosure, the first and second joints are formed on the first joint member, and the third and fourth joints are formed on the second joint member.

In addition, in the mobility device according to the exemplary form of the present disclosure, suspensions may be mounted on the first and second link arms.

Still another exemplary form of the present disclosure provides a mobility device which is made by mounting a sidecar on at least one side of a tilting vehicle including a two-wheeled bicycle, the mobility device including: i) first and second link arms which are linked to a vehicle body of the tilting vehicle while forming first and second joints, linked to a body of the sidecar while forming third and fourth joints, and disposed in parallel with each other in a front and rear direction of the vehicle body; ii) a first cowl member which is installed on the vehicle body through a main cowl frame; and iii) a second cowl member which is installed on the sidecar body through a sub cowl frame.

In still another form, the mobility device may further include: a guide member which has a guide hole rounded and inclined from a lower side to an upper side in the front and rear direction of the vehicle body, and is installed on the main cowl frame; and a sliding member which is installed on the sub cowl frame and slidably coupled to the guide hole of the guide member.

Yet another exemplary form of the present disclosure provides a mobility device which is made by mounting a sidecar on at least one side of a tilting vehicle including a two-wheeled bicycle, the mobility device including: i) first and second link arms which are linked to a vehicle body of the tilting vehicle while forming first and second joints, linked to a body of the sidecar while forming third and fourth joints, and disposed in parallel with each other in a front and rear direction of the vehicle body; and ii) a trailer which is installed to be connected to a rear side of the sidecar body through a connecting member.

In addition, in the mobility device according to the exemplary form of the present disclosure, the trailer may include: a bottom frame which is connected to a rear side of the sidecar body; and at least one safety bar which is installed on the bottom frame in the front and rear direction of the vehicle body.

In addition, in the mobility device according to the exemplary form of the present disclosure, the connecting member may include: a towing loop which is fixedly installed horizontally at a center of a rear end of the sidecar body; and a coupling loop which is fixedly installed vertically at a center of a front side of the trailer and connected to the towing loop.

In addition, in the mobility device according to the exemplary form of the present disclosure, the connecting member may include: a towing loop which is disposed vertically at a center of a rear end of the sidecar body and installed to be rotatable in a left and right direction; and a coupling loop which is fixedly installed horizontally at a center of a front side of the trailer and connected to the towing loop.

In addition, the mobility device according to the exemplary form of the present disclosure may further include: a first cowl member which is installed on the vehicle body through a main cowl frame; and a second cowl member which is installed on the sidecar body through a sub cowl frame.

The exemplary forms of the present disclosure adopt the articulated link member capable of implementing the upward and downward movement and the leftward and rightward tilting of the sidecar in accordance with a gradient of the tilting vehicle, and as a result, it is possible to achieve steering performance and turning stability of the sidecar when the tilting vehicle performs cornering and turning.

In addition, other effects, which may be obtained or expected by the exemplary forms of the present disclosure, will be directly or implicitly disclosed in the detailed description on the exemplary forms of the present disclosure. That is, various effects expected according to the exemplary forms of the present disclosure will be disclosed in the detailed description to be described below.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
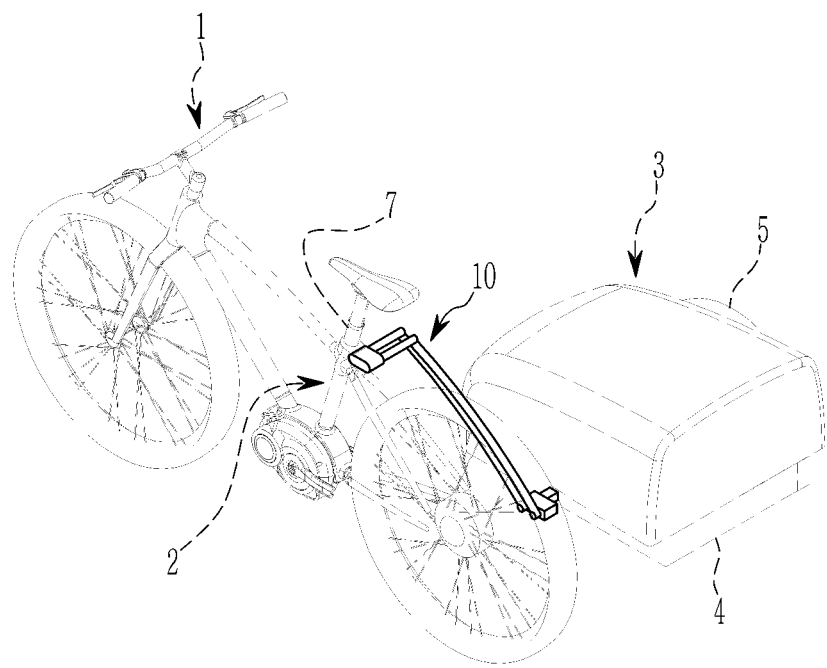
FIG. 1 is a view illustrating an example of a mobility device according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

Figure 2:
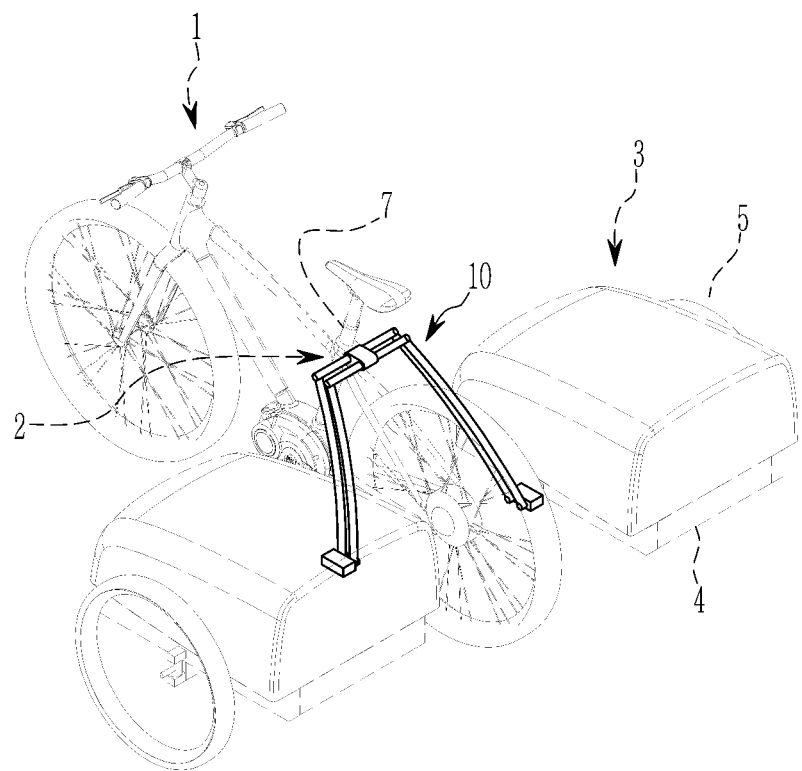
FIG. 2 is a view illustrating another example of the mobility device according to the exemplary form of the present disclosure.

FIG. 1 is a view illustrating an example of a mobility device according to an exemplary form of the present disclosure, and FIG. 2 is a view illustrating another example of the mobility device according to the exemplary form of the present disclosure.

Referring to FIGS. 1 and 2, a mobility device 100 may be applied to a tilting vehicle 1 which is a moving means such as a two-wheeled bicycle and tilts while a center of gravity moves in a left direction and a right direction toward a center of a turning radius when the tilting vehicle 1 performs cornering and turning.

The tilting vehicle 1 includes a front wheel unit, a rear wheel unit, and a steering handle which are mounted on a bicycle frame. Here, the bicycle frame may include a head tube, a seat tube, a top tube, a down tube, left and right seat stays, and left and right chain stays.

Furthermore, the mobility device 100 according to the exemplary form of the present disclosure may be applied to an electric bicycle, as the tilting vehicle 1, which has a battery and a motor mounted on a bicycle frame and travels by being driven by the motor.

Hereinafter, the bicycle frame of the tilting vehicle 1 is referred to as a vehicle body 2, and the vehicle body 2 may be configured by one frame or two or more divided frames. Further, the vehicle body 2 may include accessory elements such as various types of brackets, casings, collars, and blocks for mounting publicly known bicycle components. However, since the various types of accessory elements are used to mount various types of bicycle components on the vehicle body 2, the accessory elements are collectively called the vehicle body 2 in the exemplary form of the present disclosure except for an exceptional case.

Meanwhile, the mobility device 100 may be structured such that a sidecar 3 is mounted on at least one side of the tilting vehicle 1 in order to transport a person or freight by using the tilting vehicle 1.

In the exemplary form of the present disclosure, as illustrated in FIG. 1, the sidecar 3 may be mounted to be connected to one side of the vehicle body 2 of the tilting vehicle 1, or as illustrated in FIG. 2, the sidecars 3 may be mounted to be connected to both sides of the vehicle body 2.

The sidecar 3 includes a sidecar body 4 connected to the vehicle body 2. Here, a single wheel 5 is installed at one side of the sidecar body 4, and the other side of the sidecar body 4 is connected to the vehicle body 2.

The sidecar body 4 may be configured by one frame or two or more divided frames, as a car frame. Further, the sidecar body 4 may include accessory elements such as brackets, casings, collars, and blocks for mounting various types of components. However, since the various types of accessory elements are used to mount various types of components on the sidecar body 4, the accessory elements are collectively called the sidecar body 4 in the exemplary form of the present disclosure except for an exceptional case.

The mobility device 100 has a structure capable of providing steering performance and turning stability of the sidecar 3 when the tilting vehicle 1 performs cornering and turning, providing durability performance and straightness of the sidecar 3, and improving maneuverability by reducing a space between the vehicle body 2 and the sidecar body 4.

To this end, the mobility device 100 may include an articulated link member 10 as a turning assisting device that links the vehicle body 2 of the tilting vehicle 1 and the sidecar body 4 of the sidecar 3.

Figure 3:
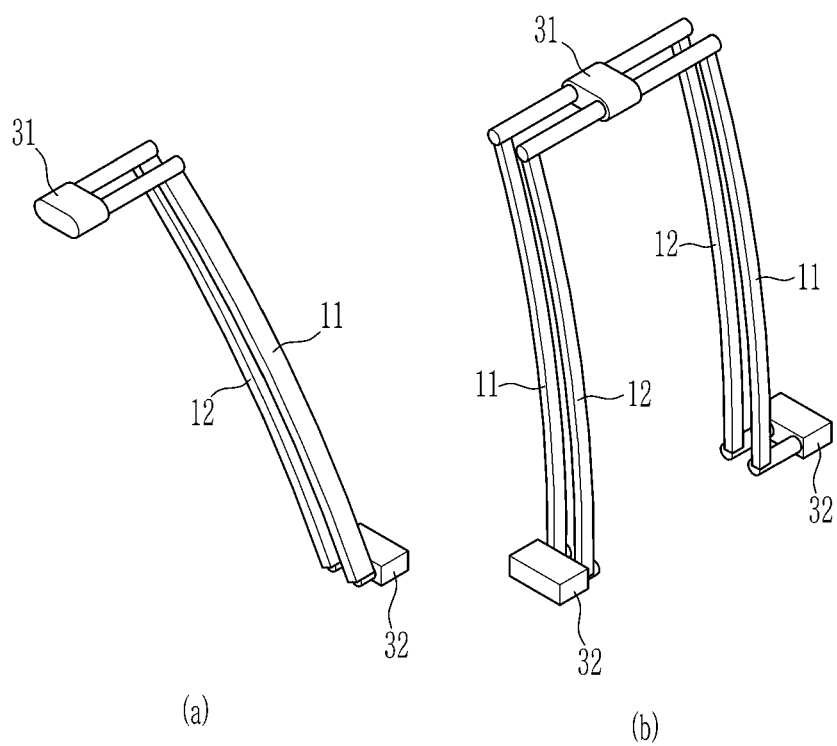
FIG. 3 is a perspective view illustrating an articulated link member applied to the mobility device according to the exemplary form of the present disclosure.
Figure 4:
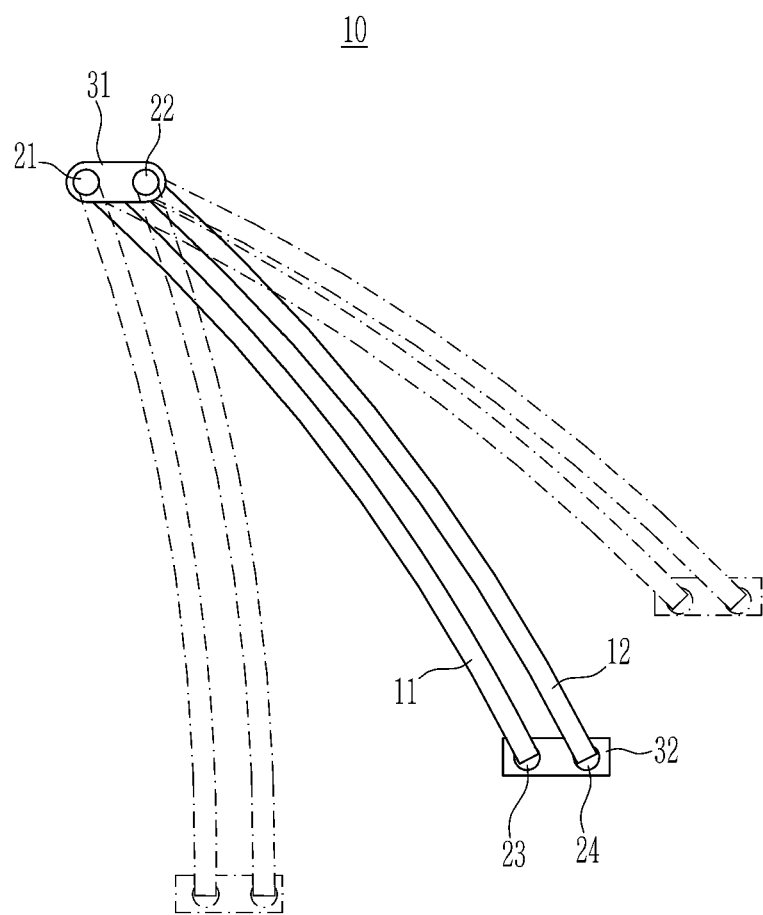
FIG. 4 is a side configuration view illustrating the articulated link member applied to the mobility device according to the exemplary form of the present disclosure.

FIG. 3 is a perspective view illustrating the articulated link member applied to the mobility device according to the exemplary form of the present disclosure, and FIG. 4 is a side configuration view illustrating the articulated link member applied to the mobility device according to the exemplary form of the present disclosure.

Referring to FIGS. 3 and 4 together with FIGS. 1 and 2, the articulated link member 10 may implement the upward and downward movements and the leftward and rightward tiltings of the sidecar 3 when a center of gravity of the vehicle body is moved leftward and rightward.

That is, when the tilting vehicle 1 performs cornering and turning through the steering handle, the articulated link member 10 may achieve stable turning and steering of the sidecar 3. Here, the leftward and rightward movements of the center of gravity of the vehicle body means that the vehicle body 2 tilts leftward and rightward when the vehicle body 2 performs cornering and turning.

The articulated link member 10 includes first and second link arms 11 and 12 that link the vehicle body 2 and the sidecar body 4. The articulated link member 10 has first to fourth joints 21, 22, 23, and 24 formed at link connection points at which the first and second link arms 11 and 12 are linked to the vehicle body 2 and the sidecar body 4. The articulated link member 10 has a parallelogrammatic shape when viewed from the lateral side because of the first and second link arms 11 and 12

Specifically, the first and second link arms 11 and 12 are disposed between the vehicle body 2 and the sidecar body 4 and link the vehicle body 2 and the sidecar body 4, the first and second link arms 11 and 12 are disposed in parallel with each other in a front and rear direction of the vehicle body 2, and the first and second link arms 11 and 12 are linked to the vehicle body 2 through one end portion thereof and linked to the sidecar body 4 through the other end thereof.

Here, the first and second link arms 11 and 12 are disposed in the up and down direction between the vehicle body 2 and the sidecar body 4, and the first and second link arms 11 and 12 are disposed in parallel with each other at a predetermined interval in the front and rear direction of the vehicle body 2.

The one end portion of the first link arm 11 and the one end portion of the second link arm 12 are linked to the vehicle body 2 and linked to a seat tube 7 of the vehicle body 2 through a first joint member 31. The other end portion of the first link arm 12 and the other end portion of the second link arm 12 are linked to the sidecar body 4 and linked to a lower center at the other side of the sidecar body 4 through a second joint member 32.

As an example, the first and second joint members 31 and 32 may link the one end portion and the other end portion of the first link arm 11 and the one end portion and the other end portion of the second link arm 12 through link connecting means such as, for example, a ball joint or a link pin.

As described above, the first and second link arms 11 and 12 are disposed in parallel with each other in the front and rear direction of the vehicle body 2 and linked to the vehicle body 2 and the sidecar body 4 through the first and second joint members 31 and 32, such that the articulated link member 10 may be configured as a parallelogrammatic 4-joint link type when viewed from the lateral side.

That is, the first and second link arms 11 and 12 may be configured as a parallelogrammatic 4-joint link type as the first and second joints 21 and 22 are formed on the first joint member 31 and the third and fourth joints 23 and 24 are formed on the second joint member 32.

The configuration in which the first and second link arms 11 and 12 link the seat tube 7 of the vehicle body 2 and the sidecar body 4 is described and illustrated in the drawings, but the present disclosure is not necessarily limited thereto, and the first and second link arms 11 and 12 may link a rear rack (not illustrated in the drawings) of the vehicle body 2 and the sidecar body 4.

Therefore, the first and second link arms 11 and 12 of the articulated link member 10 may perform linkage movements in the front and rear direction in a predetermined linkage section, that is, in a section between the first and second link arms 11 and 12.

For example, when the vehicle body 2 tilts in one direction, the articulated link member 10 may perform a linkage movement in which a distance between the first and second link arms 11 and 12 is decreased at a predetermined reference position of the first and second link arms 11 and 12 and the first and second link arms 11 and 12 move rearward.

When the vehicle body 2 stands upright at an original position, the articulated link member 10 may perform a linkage movement in which the distance between the first and second link arms 11 and 12 is increased and the first and second link arms 11 and 12 return to the reference position while moving forward.

Further, when vehicle body 2 tilts in the other direction, the articulated link member 10 may perform a linkage movement in which the distance between the first and second link arms 11 and 12 is increased at the predetermined position of the first and second link arms 11 and 12 and the first and second link arms 11 and 12 move forward.

When the vehicle body 2 stands upright at the original position, the articulated link member 10 may perform a linkage movement in which the distance between the first and second link arms 11 and 12 is decreased and the first and second link arms 11 and 12 return to the reference position while moving rearward.

Figure 5:
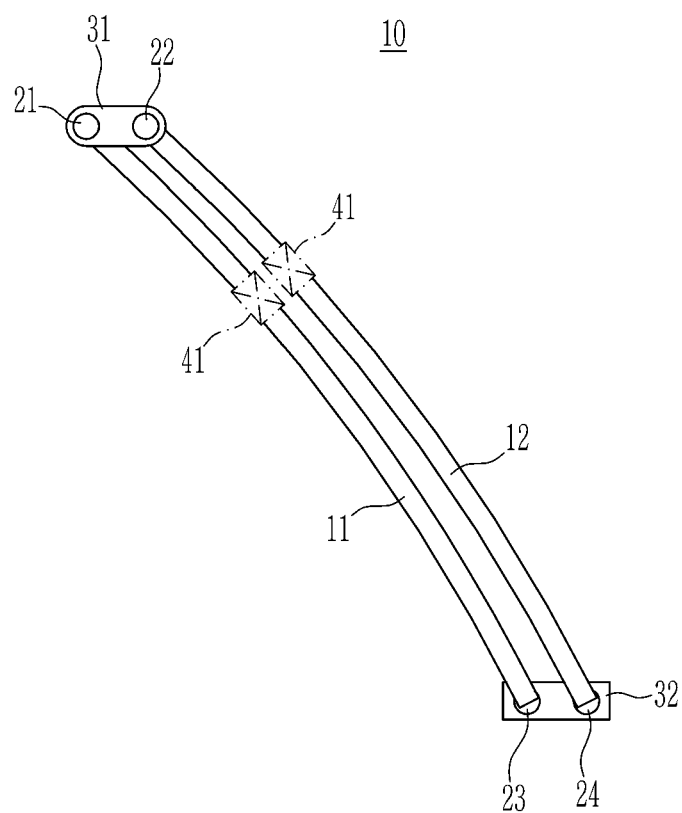
FIG. 5 is a view illustrating a modified example of the articulated link member applied to the mobility device according to the exemplary form of the present disclosure.

Meanwhile, in the exemplary form of the present disclosure, as illustrated in FIG. 5, the articulated link member 10 may further include suspensions 41 which are installed on the first and second link arms 11 and 12, respectively. The suspension 41 may be installed on any one of the first and second link arms 11 and 12, or the suspensions 41 may be installed on the first and second link arms 11 and 12, respectively.

The suspension 41 is configured to absorb impact transmitted to the body 4 of the sidecar 3 when the tilting vehicle 1 travels, and for example, the suspension 41 may include a suspension spring. Because the configuration of the suspension 41 is configured as a suspension for a bicycle of a publicly known technology widely known in the art, a more detailed description of the configuration will be omitted in the present specification.

Hereinafter, an operation of the mobility device 100 according to the exemplary form of the present disclosure, which is configured as described above, will be described in detail with reference to the previously disclosed drawings and the accompanying drawings. Hereinafter, as illustrated in FIG. 2, the mobility device 100 made by mounting the sidecars 3 at both sides of the vehicle body 2 will be described as an example.

FIGS. 6 to 10 are views for explaining an operation of the mobility device according to the exemplary form of the present disclosure.

Figure 6:
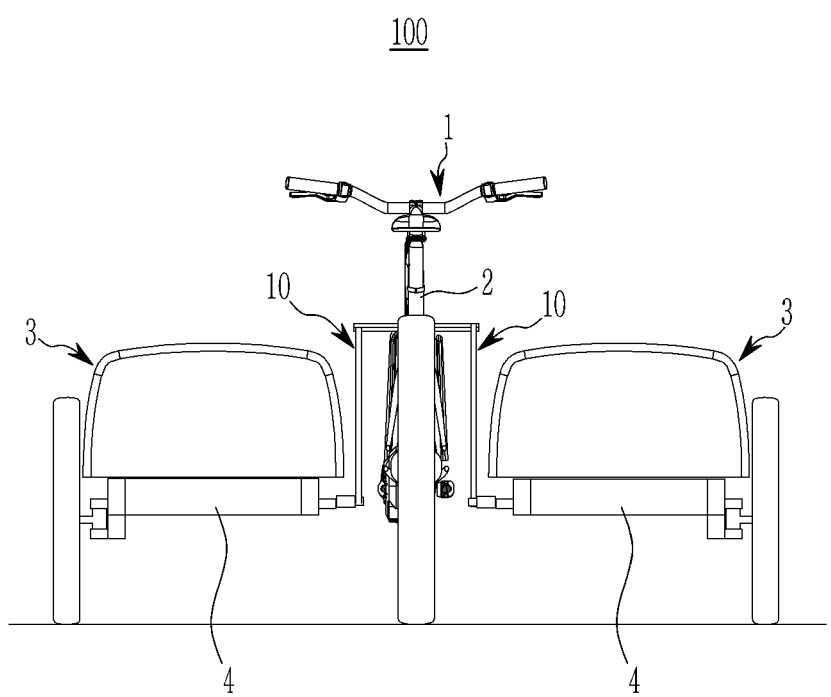
FIGS. 6 to 10 are views for explaining an operation of the mobility device according to the exemplary form of the present disclosure.

Referring to FIG. 6, first, when the tilting vehicle 1 travels straight, the left and right sidecars 3 travel together with the tilting vehicle 1 while maintaining the same height based on a height of the vehicle body of the tilting vehicle 1 when viewing the tilting vehicle 1 from the front side. Here, the first and second link arms 11 and 12 of the articulated link member 10 support the vehicle body 2 and the sidecar body 4 at the predetermined reference position.

Figure 7:
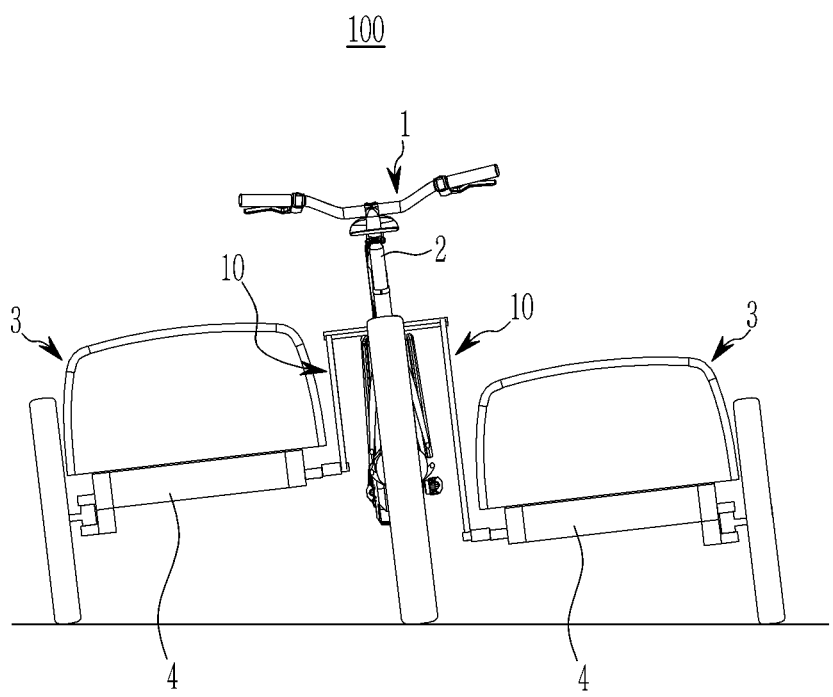
Figure 8:
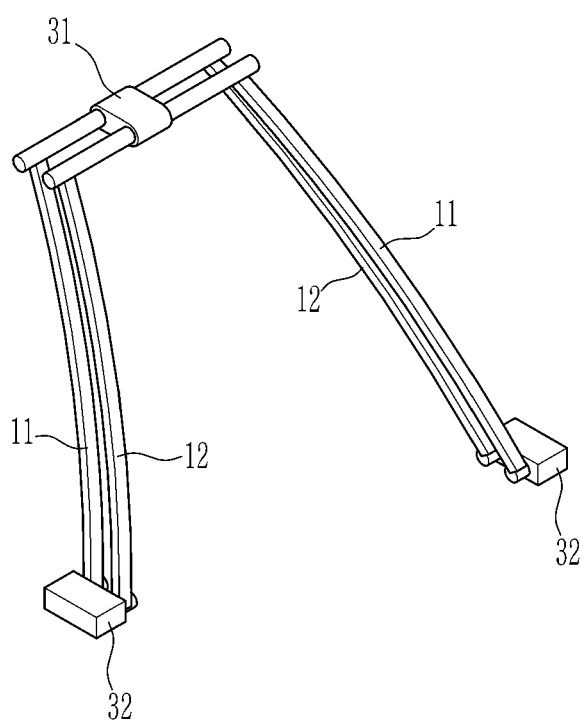
Figure 9:
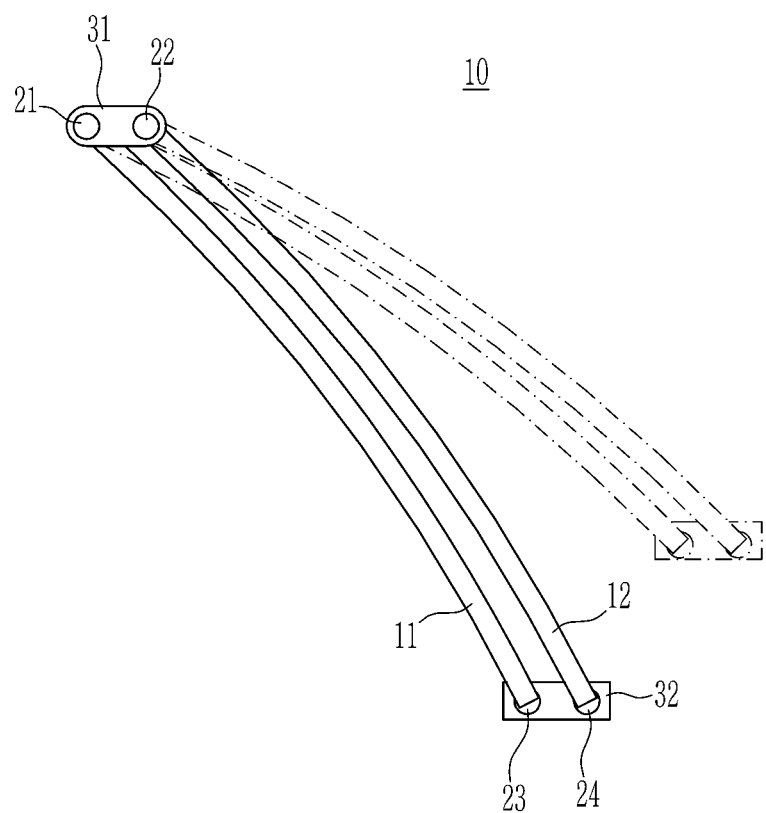

In this state, when the tilting vehicle 1 performs cornering and turning to the right as illustrated in FIG. 7, the right articulated link member 10 performs the linkage movement in which the distance between the first and second link arms 11 and 12 is decreased at the predetermined reference position of the first and second link arms 11 and 12 and the first and second link arms 11 and 12 move rearward, as illustrated in FIGS. 8 and 9. In this case, the first and second link arms 11 and 12 perform the linkage movements about the first to fourth joints 21, 22, 23, and 24 of the first and second joint members 31 and 32.

Figure 10:
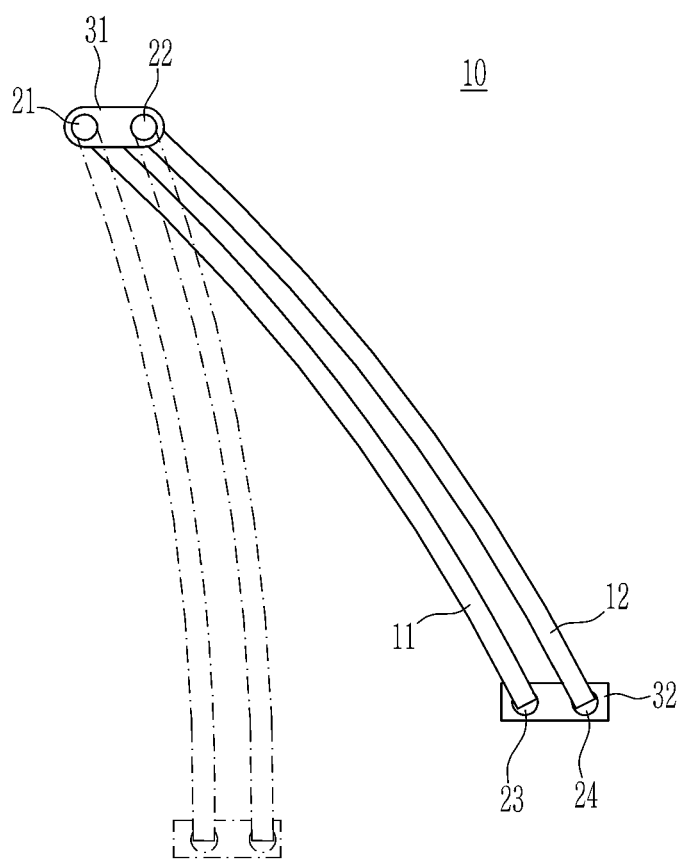

In this process, as illustrated in FIGS. 8 and 10, the left articulated link member 10 performs the linkage movement in which the distance between the first and second link arms 11 and 12 is increased at the predetermined reference position of the first and second link arms 11 and 12 and the first and second link arms 11 and 12 move forward. In this case, the first and second link arms 11 and 12 perform the linkage movements about the first to fourth joints 21, 22, 23, and 24 of the first and second joint members 31 and 32.

Therefore, as illustrated in FIG. 7, by the tilting of the vehicle body 2, the upward and downward movement of the left and right sidecars 3 may be implemented with a difference in position in the up and down direction between the left and right sidecars 3, and the leftward and rightward tilting of the left and right sidecars 3 may be implemented when viewed from the front side.

On the contrary, in the exemplary form of the present disclosure, when the tilting vehicle 1 performs cornering and turning to the left, the left and right articulated link members 10 may implement the upward and downward movements and the leftward and rightward tilting of the left and right sidecars 3 while performing the linkage movements in the opposite directions.

Accordingly, the mobility device 100 may adopt the articulated link member 10, which may implement the upward and downward movements and the leftward and rightward tilting of the sidecar 3 in accordance with the gradient of the tilting vehicle 1, such that it is possible to achieve steering performance and turning stability of the sidecar 3 when the tilting vehicle 1 performs cornering and turning.

In addition, the exemplary form of the present disclosure adopts the 4-joint link type articulated link member 10, which has a parallelogrammatic shape when viewed from the lateral side, such that a space between the vehicle body 2 and the sidecar body 4 may be reduced, and maneuverability of the mobility device 100 is improved.

Furthermore, unlike the related art which adopts a link device, which has a parallelogrammatic shape when viewed from the front side, the exemplary form of the present disclosure adopts the articulated link member 10, which has a parallelogrammatic shape when viewed from the lateral side, such that the articulated link member 10 may perform the linkage movements in the up and down direction in the front and rear direction of the vehicle body 1.

Therefore, in the exemplary form of the present disclosure, it is possible to improve durability and rigidity by dispersing fatigue impact applied to the link arms 11 and 12 and the joints 21, 22, 23, and 24 of the articulated link member 10, and it is possible to design the mobility device 100 which is light in weight.

In another form, it is possible to disperse impact and vibration, which are applied to the sidecar 3, in the front and rear direction of the vehicle body 2 through the articulated link member 10, and as a result, it is possible to improve straightness of the sidecar 3.

Figure 11:
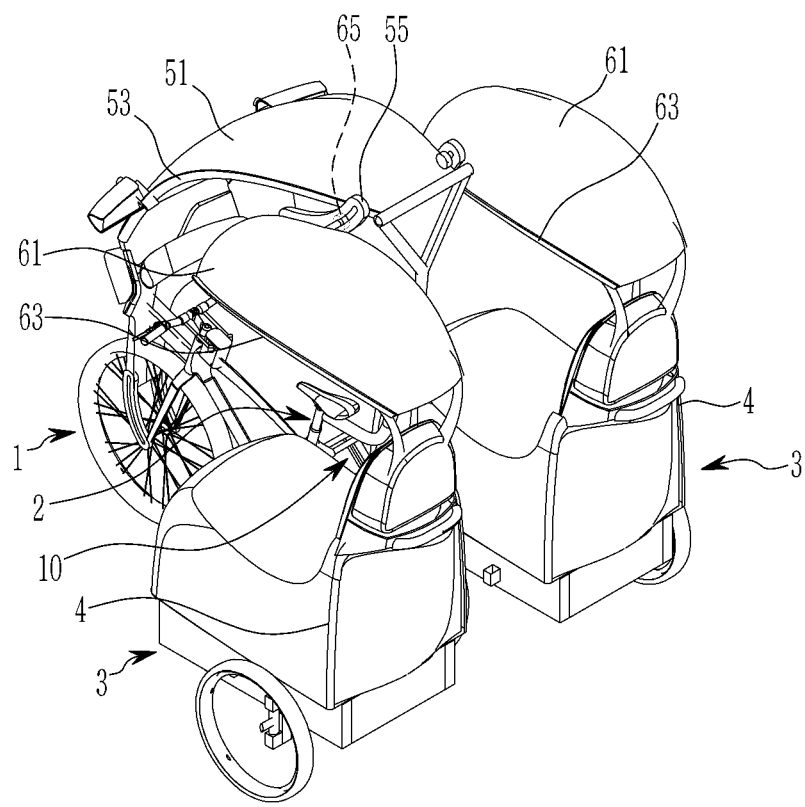
FIG. 11 is a perspective view illustrating a mobility device according to another exemplary form of the present disclosure.

FIG. 11 is a perspective view illustrating a mobility device according to another exemplary form of the present disclosure. In the drawing, constituent elements, which are identical to those in the aforementioned exemplary form, are denoted by the same reference numerals as the constituent elements in the aforementioned exemplary form.

Referring to FIG. 11, a mobility device 200 may include the articulated link member 10 described in the aforementioned exemplary form and may include first and second cowl members 51 and 61 which are mounted on the tilting vehicle 1 and the sidecar 3, respectively. Here, the first and second cowl members 51 and 61 may be made of various materials and may be manufactured to have various shapes.

In one form, the first cowl member 51 is installed on the vehicle body 2 through a main cowl frame 53. The main cowl frame 53 is fixedly installed on the vehicle body 2, and for example, the main cowl frame 53 has portions spaced apart from each other in a vehicle width direction, and the main cowl frame 53 is rounded from the front side to the rear side of the vehicle body 2.

Further, in another form, the second cowl member 61 is installed on the body 4 of the sidecar 3 through a sub cowl frame 63. The sub cowl frame 63 is fixedly installed on the sidecar body 4, and for example, the sub cowl frame 63 has portions spaced apart from each other in a car width direction, and the sub cowl frame 63 is rounded from the rear side to the front side of the sidecar body 4.

Here, the upward and downward movements and the leftward and rightward tilting of the sidecar 3 are implemented by the articulated link member 10 when the tilting vehicle 1 performs cornering and turning, and therefore, guide means for guiding the movement of the sidecar 3 are provided on the main cowl frame 53 and the sub cowl frame 63.

Figure 12:
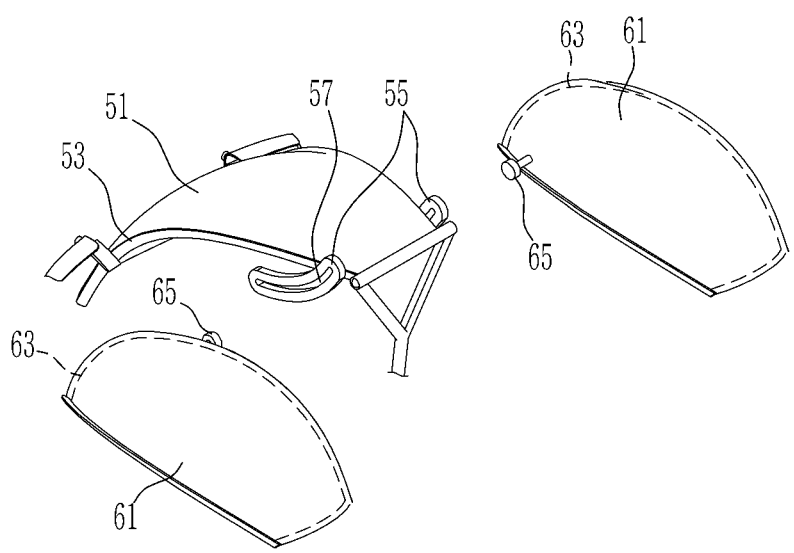
FIG. 12 is a view illustrating a cowl connection structure applied to the mobility device according to another exemplary form of the present disclosure.

As illustrated in FIGS. 11 and 12, the guide means include a guide member 55 which is installed on the main cowl frame 53, and a sliding member 65 which is installed on the sub cowl frame 63.

The guide member 55 has a guide hole 57 which is rounded and inclined from the lower side to the upper side in the front and rear direction of the vehicle body 2 in order to correspond to the upward and downward movements and the leftward and rightward movements of the sidecar 3.

Further, the sliding member 65 is fitted into the guide hole 57 of the guide member 55 without being withdrawn from the guide hole 57 and slides along the guide hole 57, such that the sliding member 65 is slidably coupled to the guide hole 57.

Therefore, according to the mobility device 200 according to another exemplary form of the present disclosure which is configured as described above, the first and second cowl members 51 and 61 are mounted on the vehicle body 2 of the tilting vehicle 1 and the body 4 of the sidecar 3, respectively, and as a result, it is possible to block rain, wind, dust, and the like and prevent exposure to the direct sunlight.

Further, when the tilting vehicle 1 performs cornering and turning, the upward and downward movements and the leftward and rightward tilting of the sidecar 3 may be implemented by the articulated link member 10, and the movement of the sidecar 3 may be guided by the guide means, and as a result, it is possible to ensure traveling performance and turning ability and implement a dynamic and stable high-occupancy mobility device.

Since the remaining configurations and the operational effects of the mobility device 200 according to another exemplary form of the present disclosure are identical to those in the aforementioned exemplary form, further detailed descriptions thereof will be omitted.

Figure 13:
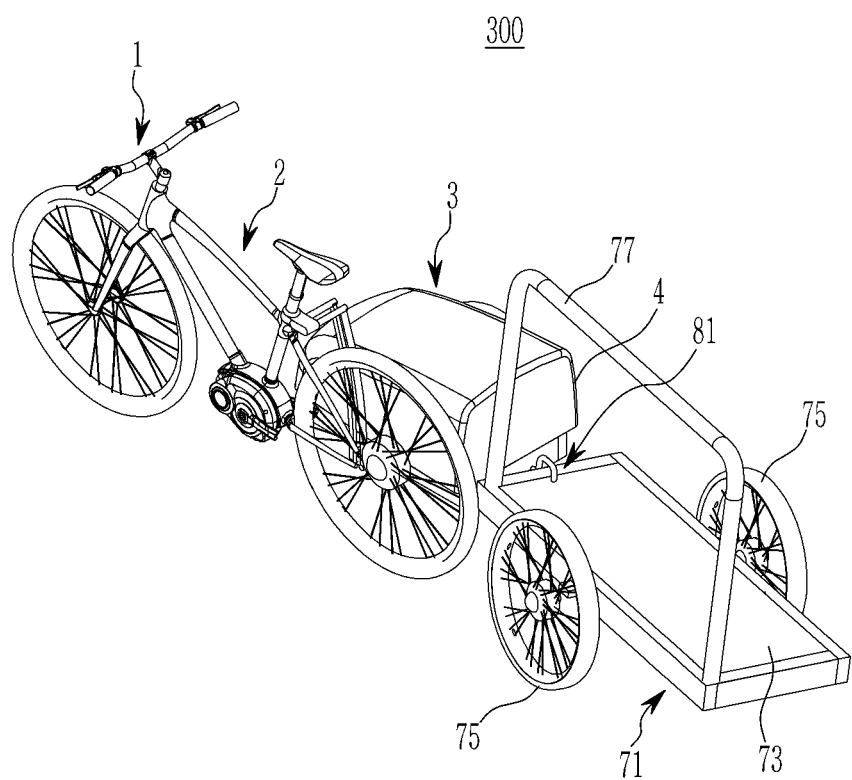
FIG. 13 is a perspective view illustrating a mobility device according to still another exemplary form of the present disclosure.

FIG. 13 is a perspective view illustrating a mobility device according to still another exemplary form of the present disclosure. In the drawing, constituent elements, which are identical to those in the aforementioned exemplary forms, are denoted by the same reference numerals as the constituent elements in the aforementioned exemplary forms.

Referring to FIG. 13, a mobility device 300 may include the structures in the aforementioned exemplary forms and may include a trailer 71 which is installed to be connected to a rear side of the sidecar 3.

In other form, the trailer 71 may include a bottom frame 73 on which several occupants may be placed or freight may be loaded. The bottom frame 73 is connected to a rear side of the sidecar body 4 and may be manufactured to have various shapes.

Left and right wheels 75 are installed on the bottom frame 73. Further, a safety bar 77, which is provided to ensure safety of the occupants when the occupants get on or off and the mobility device 300 travels, is installed on the bottom frame 73 in the front and rear direction of the vehicle body 2.

The bottom frame 73 of the trailer 71 is installed to be connected to the rear side of the sidecar body 4 through a connecting member 81. The connecting member 81 has a structure capable of absorbing the movement of the sidecar 3 and may connect the body 4 of the sidecar 3 and the bottom frame 73 of the trailer 71.

Figure 14:
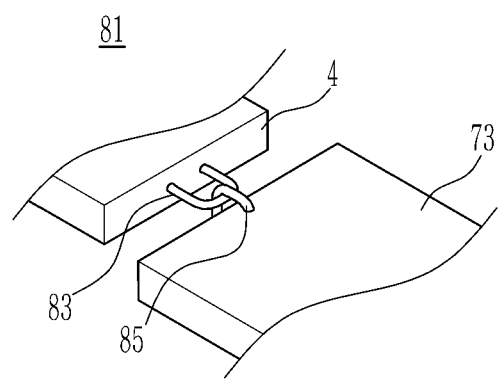
FIG. 14 is a view illustrating an example of a trailer connection structure applied to the mobility device according to still another exemplary form of the present disclosure.

As illustrated in FIG. 14, the connecting member 81 includes a towing loop 83 which is fixedly installed at a rear end of the sidecar body 4, and a coupling loop 85 which is fixedly installed at a front end of the bottom frame 73.

The towing loop 83 is a "⊃"-shaped loop, and the towing loop 83 is fixedly installed horizontally at a center of the rear end of the sidecar body 4. Further, the coupling loop 85 is a "⊃"-shaped loop, and the coupling loop 85 is fixedly installed vertically at a center of a front side of the bottom frame 73 and connected to the towing loop 83.

Figure 15:
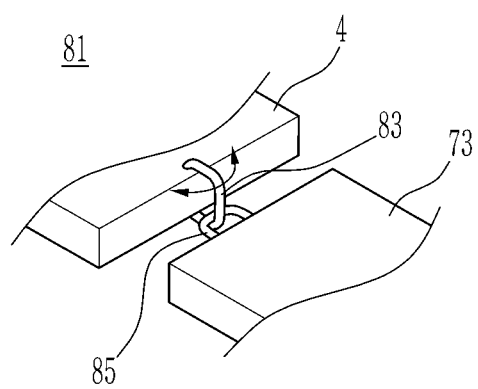
FIG. 15 is a view illustrating a modified example of the trailer connection structure applied to the mobility device according to still another exemplary form of the present disclosure.

Alternatively, as illustrated in FIG. 15, the towing loop 83 of the connecting member 81 may be disposed vertically at a center of a rear end of the sidecar body 4 and may also be installed to be rotatable in the left and right direction. Further, the coupling loop 85 may be fixedly installed horizontally at the center of the front side of the bottom frame 73 and connected to the towing loop 83.

Therefore, according to the mobility device 300 according to still another exemplary form of the present disclosure which is configured as described above, several occupants may be placed or freight may be loaded on the trailer 71 connected to the sidecar 3, and as a result, the mobility device 300 may be utilized as a bus or a freight vehicle.

Since the remaining configurations and the operational effects of the mobility device 300 according to still another exemplary form of the present disclosure are identical to those in the aforementioned exemplary forms, further detailed descriptions thereof will be omitted.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

What is claimed is:

1. A mobility device including a sidecar and a tilting vehicle including a two-wheeled bicycle, the mobility device comprising:
a first link arm and a second link arm, which are respectively linked to a vehicle body of the tilting vehicle at first and second joints, and respectively linked to a body of the sidecar at third and fourth joints, wherein:
the first and second link arms are disposed in parallel with each other,
the first link arm is disposed in front of the second link arm in a front and rear direction of the vehicle body, and
the first and second link arms are linked to a seat tube of the vehicle body through a first joint member and linked to a lower center of a side of the sidecar body through a second joint member.

2. The mobility device of claim 1, wherein:
the first and second joints are formed on the first joint member, and the third and fourth joints are formed on the second joint member.

3. The mobility device of claim 1, wherein:
suspensions are mounted on the first and second link arms.

4. The mobility device of claim 1, further comprising:
a first cowl member which is installed on the vehicle body through a main cowl frame; and
a second cowl member which is installed on the sidecar body through a sub cowl frame.

5. The mobility device of claim 4, further comprising:
a guide member including a guide hole and installed on the main cowl frame, wherein the guide hole is rounded and inclined from a lower side to an upper side in the front and rear direction of the vehicle body; and
a sliding member which is installed on the sub cowl frame and slidably coupled to the guide hole of the guide member.

6. The mobility device of claim 1, further comprising: a trailer connected to the sidecar body through a connecting member.

7. The mobility device of claim 6, wherein:
the trailer includes:
a bottom frame connected to a rear side of the sidecar body; and
at least one safety bar installed on the bottom frame in the front and rear direction of the vehicle body.

8. The mobility device of claim 6, wherein:
the connecting member includes:
a towing loop fixedly and horizontally installed at a center of a rear end of the sidecar body; and
a coupling loop fixedly and vertically installed at a center of a front side of the trailer and connected to the towing loop.

9. The mobility device of claim 6, wherein:
the connecting member includes:
a towing loop disposed vertically at a center of a rear end of the sidecar body and installed to be rotatable in a left and right direction of the vehicle body; and
a coupling loop fixedly and horizontally installed at a center of a front side of the trailer and connected to the towing loop.

10. The mobility device of claim 6, further comprising:
a first cowl member installed on the vehicle body through a main cowl frame; and
a second cowl member installed on the sidecar body through a sub cowl frame.

11. The mobility device of claim 10, further comprising:
a guide member which is installed on the main cowl frame and has a guide hole rounded and inclined from a lower side to an upper side in the front and rear direction of the vehicle body; and
a sliding member which is installed on the sub cowl frame and slidably coupled to the guide hole.

* * * * *